United States Patent Office 2,979,763
Patented Apr. 18, 1961

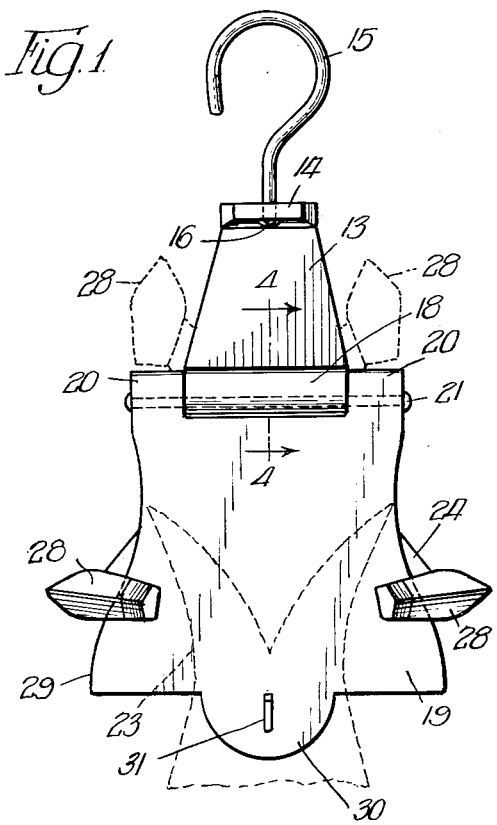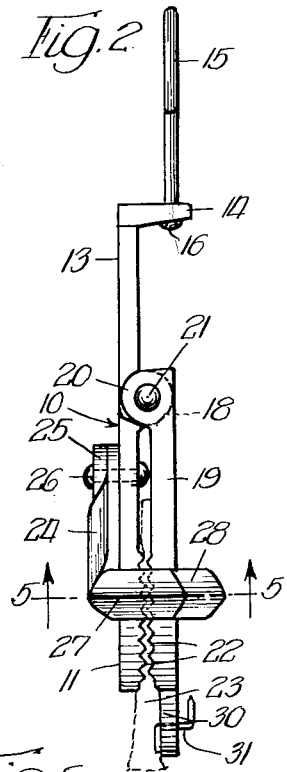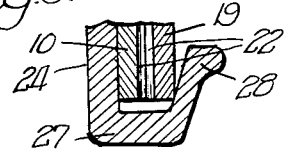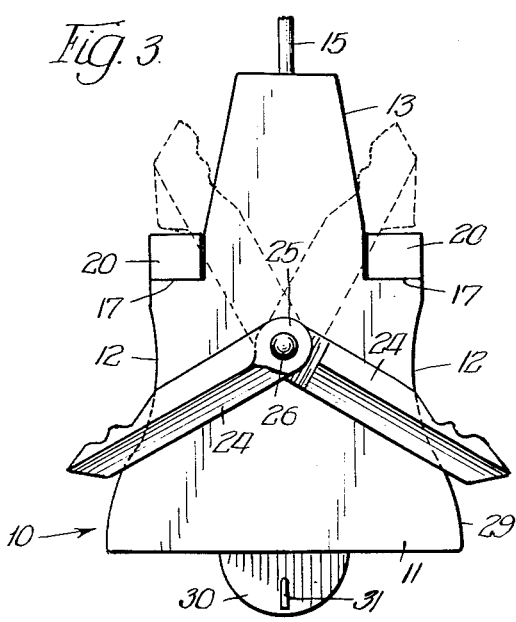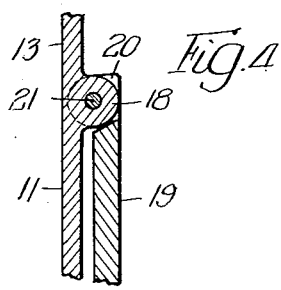

2,979,763

FISH HANDLING AND SCALING CLAMPS

Leon Stabryla, 2064 N. Western Ave., Chicago, Ill.

Filed Sept. 22, 1958, Ser. No. 762,608

7 Claims. (Cl. 17—8)

The present invention relates to the fish handling and scaling clamps for engaging and firmly holding the tail of a fish during the scaling operation.

The principal object of the present invention is the provision of a clamp of the type and for the purpose above indicated, which may be provided with a stationary jaw and a hingedly connecting therewith movable jaw, with a comparatively simple and easily operable means for holding the two jaws in their operative locked relation while clamping a fish tail therebetween during the scaling operation upon the fish.

A still further object of the present invention is the provision, in a clamp of the character indicated, of a pair of clamping jaws, each formed out of rigid plate of suitable material, both hingedly interconnected, and provided with comparatively simple means for interengaging the two jaws along their edges for maintaining the fish tail in a locked position therebetween, and which means may be capable of operation by gravity for interengaging the two jaws or freeing them from their locked engagement.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

Fig. 1 is a face elevational view of the clamp, taken from the side of the movable jaw thereof;

Fig. 2 is an edge elevational view thereof;

Fig. 3 is the rear face elevational view of the clamp, taken from the side of the stationary jaw thereof;

Fig. 4 is a fragmentary cross sectional view taken on line 4—4 of Fig. 1; and

Fig. 5 is a cross sectional view on line 5—5 of Fig. 2.

Referring in detail to the present drawing there is shown therein a stationary jaw, generally indicated by 10 in Fig. 3, which includes the lower section 11, which is of substantially trapezoidal formation, with its lower end wider and its upper end narrower, and having its side edges inwardly curved as at 12. Extending centrally from the upper end of section 11 is a narrow tongue 13, provided with a forwardly turned horizontal lip 14, through which the lower end of hook 15 is passed and provided with a rivet head 16 for connecting the clamp with said hook 15 in a swivelled relation.

The side edges adjacent the base of said tongue 13, in conjunction with the resulting lateral offsets at the upper end of said section 11 of said stationary jaw 10, define recesses 17, for the purpose hereinafter stated.

Rigidly formed with the lower end of said tongue 13, in a transverse relation therewith, and extending from the front face thereof, is a bulge defining a hinge section 18.

The movable jaw defined by plate 19 is of a trapezoidal shape and generally conforms in its configuration to the configuration of the lower section 11 of the stationary jaw 10.

Extending to the rearward direction from the upper end of said movable jaw 19 is a pair of ears 20, one adjacent each side edge of said movable jaw 19. Said ears 20, in conjunction with the intermediate upper edge of said movable jaw 19 define a recess within which said hinge section 18 is accommodated. Said hinge section 18 and said ears 20 are in a mutual alinement in a transverse relation with the clamp, and receive shaft 21, upon which said ears 20 are adapted for a rotary shifting movement for angularly shifting said movable jaw 19 to an open or closed relation with said stationary jaw 10. Said ears 20 are accommodated within said recesses 17.

Adjacent the lower ends of said jaws 10 and 19, and on the inner faces thereof, a plurality of complementary serrations or teeth 22 are made, which extend in a transverse relation with the clamp, for the purpose of frictionally engaging tail 23 of a fish when disposed between said jaws and when said jaws are closed, for the purpose of interengaging the tail end of the fish while the scaling operation upon the fish body takes place.

Means are provided for interlocking the clamp jaws when the same remain in a closed position. Said means includes a pair of arms 24 which are in contact with the rear face of the stationary jaw 10. The inner ends of said arms 24 are reduced in thickness, as at 25, and stacked one upon the other. Rivet 26 passed through said stationary jaw 10 and said reduced ends 25 of said arms 24 defines a pivot upon which said arms 24 are adapted for angular shifting movement to their operative position shown in full lines, or to their inoperative position shown by the dotted lines, in Figs. 1 and 3.

Extending from the free ends of said arms 24 in a forwardly direction, and in a transverse relation with the jaws of the clamp, are connecting bars 27. Extending from the free, front ends of said bars 27 are substantially horizontal extensions 28. Said extensions 28 when in an operative clamp-engaging position, assume a horizontal position in a transverse relation with the front face of movable jaw 19, while said arms 24 remain in an angular juxtaposition with relation to said extensions 28, as is seen in full lines in Fig. 1. The inner faces of said extensions 28 are not in parallelism with the inner faces of said arms 24, but are outwardly flaring, as seen in Fig. 5, for the purpose of engaging the adjacent outward face portions of said movable jaw 19, at any given point at the inner faces of said extensions 28, depending upon the thickness of the fish tail disposed between said clamp jaws 10 and 19. Normally, in the absence of a fish tail between teeth 22 said jaws 10 and 19 would remain in a contactual relation by their respective teeth 22, thereby permitting the side edges of said jaws to fully enter the U defined by said arms 24, bars 27 and extensions 28, with the side edges of said jaws in contact with the inner faces of said bars 27. Thus, the adjacent ends of arms 24, bars 27 and extensions 28 act as latches for said jaws 10 and 19, pressing movable jaw 19 towards said stationary jaw 10 with a fish tail of any reasonable thickness interposed therebetween.

It is further observed that when said latches remain in their inoperative position, indicated by dotted lines in Figs. 1 and 3, extensions 28 are out of the path of angular shifting movement of movable jaw 19, permitting said jaw to angularly swing upon its hinge 18–20 for positioning fish tail 23 upon teeth 22 of stationary jaw 11. Thereupon movable jaw 19 is released and is permitted to fall upon the fish tail. Thereupon the said latches are released from manual hold, and are permitted to fall, due to gravity, in a downward direction to engage the side edges of the two jaws as was pointed out.

Further manual pressure at extensions 28, in a downward direction, will shift said latches downwardly until a strong frictional engagement is brought about between the side edge portions of the two clamping jaws and the said latches, including the adjacent ends of arms 24 and said extensions 28.

It is further noted that the connection between the inner ends of arms 24 and said rivet 26 is rather loose, permitting free angular swinging motion of said arms 24 in either direction, particularly permitting falling of the said latches in a downward direction, due to gravity, when the clamp is supported in a vertical position, so as to quickly bring said latches in engagement with the outer face portions of the movable jaw 19, once the latter jaw has been swung to its operative clamping position with the fish tail. This preliminary engagement of the latches with the jaws, brought about by the gravitational swinging movement of the latches in a downward direction will be sufficient to maintain the fish tail in a clamped position with the jaws, with the remaining portion of the fish body in a hanging position from the clamp, preliminarily to the manual pressure upon the latches in a downward direction to bring about the ultimate strong engagement thereof with the clamping jaws.

Note is made of the fact that curvatures 12 at the side edges of the two jaws effect gradual divergent flares 29 in the two clamping jaws in a downward direction, thereby permitting quick engagement of the latches with the sides of the clamp jaws, both during the preliminary engagement of the latches with the jaws, immediately after the latches were permitted to fall in a downward direction, and during the later, more positive stage of the engagement of said latches with the jaws when manual pressure in a downward direction is brought about to effect a strong, positive interengagement between said latches and the two clamp jaws, for bringing about the ultimate strong engagement of the two jaws with the fish tail interposed therebetween.

A downwardly depending tab 30 is provided at the lower edge of the movable jaw 19, and centrally thereof. Said tab constitutes means whereby by manual hold at said tab 30 movable jaw 19 may be readily swung to its angular position with relation to said stationary jaw 10, either for the purpose of releasing the fish tail from its engagement by the jaws, after the said latches have been swung to their inoperative position, indicated by dotted lines in Figs. 1 and 3, or preparatory to the positioning of the fish tail upon teeth 22 of said stationary jaw 10 in readiness to be engaged by said movable jaw 19 when the manual hold at tab 30 is released and said movable jaw 19 is permitted to fall to its clamping position as shown in Fig. 2.

Another function of said tab 30 is to support hook 31. Said hook 31 is of a substantially Z-shaped formation and is insertable within a transverse aperture made in tab 30. The central shank portion of said hook 31 reposes within said aperture, and the front sharp operative end of said hook extends from the front face of said tab 30, while the rear end of said hook 31 contacts the rear face of said tab 30, when the hook remains in an operative position with the said tab. The operative end of the hook is adapted to pierce and engage the lip of a fish's mouth whereby the fish may be supported with its head in engagement with the movable jaw 19. The aperture in tab 30 wherein the central shank portion of hook 31 is fitted is sufficiently wide so as to permit insertion or withdrawal of the hook from tab 30 by manipulation of said hook 31. If preferred said hook 31 may be rigidly engaged with tab 30 so as to constitute a permanent fixture with tab 30.

While for scaling operation it is preferable to suspend the fish from the clamp with tail 23 engaged by the clamp, for skinning operation it is more practicable to engage the head of the fish with hook 31. Thus, said hook 31 constitutes an alternative means for supporting the fish for skinning or gutting operation.

Hook 15 is capable of suspension upon a rafter or a nail projecting from any structural wall. When thus engaged said hook 15 will support the clamp in a vertical position while the fish supported thereon undergoes scaling operation. If desired, the clamp may be supported horizontally upon any suitable horizontal support such as bread board or the like, with a nail driven thereinto for engaging hook 15 therewith. Due to the swivelled connection between hook 15 and lip 14 the clamp is capable of shifting movement upon a transverse plane, thereby permitting turning of a fish for scaling operation. Of course, if the clamp remains in a horizontal position there is actually no need for the latches to preliminarily engage the clamping jaws due to the fact that when the clamp remains supported horizontally the fish necessarily will be also supported in the same manner. Thus, in that latter instance, once the fish tail has been interposed between the clamp jaws the latches are manually swung to their operative position and manually pressed along the edges of said clamping jaws to shift said latches as far as they will go for the purpose of bringing about a strong clamping action of the jaws.

While there are described herein preferred embodiments of the present invention, it is nevertheless to be understood that minor changes may be made therein without departing from the spirit and scope of the invention as claimed.

What I claim as new is:

1. A fish scaling clamp cabale of engaging a fish tail for supporting the fish body during scaling operation, comprising a stationary jaw, a movable jaw hingedly connected to said stationary jaw intermediately of the ends of the latter, said movable jaw being capable of angular swinging motions to its operative, substantially parallel, contactual relation with said stationary jaw or to its inoperative angular relation with said stationary jaw, and a pair of latches pivotally supported along the outer face of said stationary jaw, said latches including substantially U-shaped members adapted to engage the opposed edges of both of said jaws when said movable jaw has been swung to its operative position with relation to said stationary jaw for firmly clamping a fish tail interposed between the two jaws.

2. A fish scaling clamp capable of engaging a fish tail for supporting the fish body during scaling operation, comprising a stationary jaw, a movable jaw hingedly connected to said stationary jaw intermediately of the ends of the latter, said movable jaw being capable of angular swinging motions to its operative, substantially parallel, contactual relation with said stationary jaw or to its inoperative angular relation with said stationary jaw, a pair of arms pivotally supported by their ends upon the outer face of said stationary jaw, and substantially U-shaped latch members carried by the opposite ends of said arms, said U-shaped latch members being in a transverse relation with the two jaws when said movable jaw has been swung to its operative position with relation to said stationary jaw, in position to engage the opposed edges of both of said jaws for firmly clamping a fish tail interposed between the two jaws.

3. A fish scaling clamp capable of engaging a fish tail for supporting the fish body during scaling operation, comprising a stationary jaw, a reduced tongue projecting from one end of said stationary jaw in a central relation with the latter, each edge of said tongue in conjunction with the adjacent end body portion of said stationary jaw defining a recess adjacent each edge of said tongue, a hinge member projecting from the base of said tongue, a movable jaw, a pair of ears each extending from the upper end of said movable jaw adjacent the side edge thereof, said ears being turned to the direction opposite of that to which said hinge member in said stationary jaw is projecting, said ears being spaced for defining a recess for accommodating said hinge member therewithin, said ears being accommodated within said recesses defined by the side edges of said tongue and the adjacent end portions of said stationary jaw, a pin passed through said ears of said hinge member for defining a hinge upon which said movable jaws is adapted for angular swinging motions to its clamped or open positions relative to said stationary jaw, and a pair of latch members pivotally supported upon the outer face of said stationary jaw, said latch members being adapted for angular swinging for engaging the opposed edges of both said jaws when said movable jaw has been swung to its clamped relation with said stationary jaw.

4. A fish scaling clamp capable of engaging a fish tail for supporting the fish body during scaling operation, comprising a stationary jaw, a movable jaw hingedly connected to said stationary jaw, said movable jaw being capable of angular swinging motions to selectively assume an operative, substantially parallel, contactual relation with one face of said stationary jaw or an inoperative angular relation therewith, an arm pivotally connected by one of its ends with the opposite face of said stationary jaw, a bar rigidly formed with the opposite end of said arm, said bar being substantially in a transverse relation with the two jaws when they remain in their mutually operative position, and an extension projecting from said bar, said opposite end of said arm, said bar and said extension defining a substantially U-shaped latch member adapted to engage the edge portions of said jaws when they remain in their mutually operative position for firmly clamping a fish tail when interposed between the two jaws.

5. A fish scaling clamp defined in claim 3, further comprising a hook connected in a swivelled relation at the opposite, free end of said tongue for supporting the clamp.

6. A fish scaling clamp capable of engaging a fish tail for supporting the fish body during scaling operation, comprising a pair of plates, a hinge connecting said plates along one end thereof whereby said plates being capable of relative angular shifting motion to an open inoperative position or to a substantially contactual, operative position, said plates defining clamping jaws for engaging a fish tail when interposed between the opposite ends of said plates when the latter have been shifted to their operative position, at least one side edges of said jaws being in a transverse alinement, an arm freely pivoted by one of its ends upon the outer face of one of said jaws, and a U-shaped latch member carried by the opposite end of said arm, said arm being capable of an angular shifting motion upon its pivot in both directions, when shifted to one direction said U-shaped latch member clearing the perimeter of said jaws, when said jaws remain in their operative position with the clamp supported in a vertical position said arm being capable of shifting due to gravity in the opposite direction for bringing said U-shaped latch member in an engaged relation with said jaws along their said edges for locking said jaws in their clamped relation with the fish tail.

7. A fish scaling clamp capable of engaging a fish tail for supporting the fish body during scaling operation, comprising a stationary jaw, a movable jaw hingedly connected to said stationary jaw, said movable jaw being capable of angular swinging motions to selectively assume an operative, substantially parallel, contactual relation with one face of said stationary jaw or an inoperative angular relation therewith, an arm pivotally connected by one of its ends with the opposite face of said stationary jaw, a bar rigidly formed with the opposite end of said arm, said bar being substantially in a transverse relation with the two jaws when they remain in their mutually operative positions, and an extension projecting from said bar, said opposite end of said arm, said bar and said extension defining a substantially U-shaped latch member adapted to engage the edge portions of said jaws when they remain in their mutually operative position for firmly clamping a fish tail when interposed between the two jaws, the inner face of said extension gradually diverging from the opposed inner face of said arm, beginning with the point of connection of said extension with said bar and terminating with the free end of said extension, whereby said U-shaped latch member may be capable of latching said jaws when in their mutually operative position with fish tail of varying thickness interposed therebetween.

References Cited in the file of this patent

UNITED STATES PATENTS

| 867,182 | Bahde | Sept. 24, 1907 |
| 1,433,668 | Stein | Oct. 31, 1922 |
| 2,152,745 | Klass | Apr. 4, 1939 |

FOREIGN PATENTS

| 46,681 | Germany | Apr. 15, 1889 |